(12) United States Patent
Fukushima

(10) Patent No.: US 11,728,990 B2
(45) Date of Patent: Aug. 15, 2023

(54) CONTROL APPARATUS

(71) Applicant: TOSHIBA TEC KABUSHIKI KAISHA, Tokyo (JP)

(72) Inventor: Takafumi Fukushima, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 41 days.

(21) Appl. No.: 17/466,701

(22) Filed: Sep. 3, 2021

(65) Prior Publication Data

US 2021/0399891 A1 Dec. 23, 2021

Related U.S. Application Data

(62) Division of application No. 16/109,602, filed on Aug. 22, 2018, now Pat. No. 11,139,974.

(30) Foreign Application Priority Data

Aug. 25, 2017 (JP) .................. 2017-162722

(51) Int. Cl.
*H04L 9/32* (2006.01)
*H04L 9/40* (2022.01)

(52) U.S. Cl.
CPC ............ *H04L 9/321* (2013.01); *H04L 9/3234* (2013.01); *H04L 63/0823* (2013.01); *H04L 63/101* (2013.01)

(58) Field of Classification Search
CPC ...................................... H04L 9/321
See application file for complete search history.

(56) References Cited

U.S. PATENT DOCUMENTS

| 5,327,425 A | 7/1994 | Niwa et al. |
| 5,367,647 A | 11/1994 | Coulson et al. |
| 5,499,018 A * | 3/1996 | Weimer ............ H04B 1/205 340/505 |

(Continued)

FOREIGN PATENT DOCUMENTS

| JP | 2002073548 A | 3/2002 |
| JP | 2006059223 A | 3/2006 |

(Continued)

OTHER PUBLICATIONS

Japanese Office Action dated Jun. 1, 2021, mailed in counterpart Japanese Application No. 2017-162722, 8 pages (with translation).

*Primary Examiner* — Bradley W Holder
(74) *Attorney, Agent, or Firm* — Kim & Stewart LLP

(57) ABSTRACT

A control apparatus includes a first interface for communicating with a first device over a local area network and a second interface for communicating with a second device over a wide area network. A processor is configured to perform an authentication operation on first device after connection to the first interface. The processor receives a first data transmission addressed to the second device from the first device, and then controls the second interface to permit the first data transmission to be transmitted to the second device over the wide area network when the first device has been authenticated. The second interface is controlled to prevent the first data transmission from being transmitted to the second device when the first device has not been authenticated.

11 Claims, 12 Drawing Sheets

(56) References Cited

U.S. PATENT DOCUMENTS

| | | | |
|---|---|---|---|
| 5,506,834 A * | 4/1996 | Sekihata | H04Q 11/0478 |
| | | | 370/468 |
| 5,535,276 A | 7/1996 | Ganesan | |
| 5,737,419 A | 4/1998 | Ganesan | |
| 5,748,735 A | 5/1998 | Ganesan | |
| 8,397,988 B1 | 3/2013 | Zuili | |
| 8,850,227 B1 | 9/2014 | Krahn et al. | |
| 10,333,819 B2 | 6/2019 | Chow et al. | |
| 10,348,767 B1 | 7/2019 | Lee et al. | |
| 10,382,401 B1 | 8/2019 | Lee et al. | |
| 10,484,334 B1 | 11/2019 | Lee et al. | |
| 2002/0083317 A1 * | 6/2002 | Ohta | H04L 9/3236 |
| | | | 713/161 |
| 2003/0133575 A1 | 7/2003 | Challener | |
| 2004/0103283 A1 | 5/2004 | Hornak | |
| 2006/0005032 A1 * | 1/2006 | Cain | H04L 63/205 |
| | | | 713/182 |
| 2010/0161969 A1 | 6/2010 | Grebovich et al. | |
| 2012/0184282 A1 | 7/2012 | Malkamaki et al. | |
| 2012/0184284 A1 | 7/2012 | Moisio et al. | |
| 2016/0294669 A1 | 10/2016 | Chow et al. | |
| 2018/0089640 A1 | 3/2018 | Fukushima | |

FOREIGN PATENT DOCUMENTS

| | | |
|---|---|---|
| JP | 2006080789 A | 3/2006 |
| JP | 2010283553 A | 12/2010 |
| JP | 2011070325 A | 4/2011 |
| JP | 2015080098 A | 4/2015 |

* cited by examiner

FIG.3

| | |
|---|---|
| DEVICE A: MAC ADDRESS | 00 90 27 AA 74 E0 |
| DEVICE A: IP ADDRESS | 192.168.090.123 |
| DEVICE A: CONNECTION DESTINATION | — — — — — — |
| DEVICE A: AUTHENTICITY | OK |
| DEVICE A: USABLE PORT NUMBER | — — |
| DEVICE A: INSTALLATION DATE AND TIME | 201701010123 |

⋮

| | |
|---|---|
| DEVICE C: MAC ADDRESS | 00 80 19 AB 26 D0 |
| DEVICE C: IP ADDRESS | 192.168.090.125 |
| DEVICE C: CONNECTION DESTINATION | — — — — — |
| DEVICE C: AUTHENTICITY | NG |
| DEVICE C: USABLE PORT NUMBER | — — |
| DEVICE C: INSTALLATION DATE AND TIME | 201702011445 |

| | |
|---|---|
| AUTHENTICITY | 0: NECESSARY, 1: RECOMMEND |
| CONNECTION DESTINATION RESTRICTION | 0: YES, 1: NO |
| PERMITTED CONNECTION DESTINATION LIST | www.service.co.jp;<br>WWW.support.co.jp; |
| PROHIBITED CONNECTION DESTINATION LIST | .○○;<br>.△△;<br>... |
| PORT RESTRICTION | 0: YES, 1: NO |
| PERMITTED PORT LIST | 80; 442; |
| INSTALLATION DATE AND TIME RESTRICTION | 0: YES, 1: NO |
| RESTRICTION DATE AND TIME (START) | 20140101 0000 |
| RESTRICTION DATE AND TIME (END) | 20171231 0000 |

FIG.9

| | |
|---|---|
| DEVICE A: MAC ADDRESS | 00 90 27 AA 74 E0 |
| DEVICE A: IP ADDRESS | 192.168.090.123 |
| DEVICE A: CONNECTION DESTINATION | ― ― ― ― ― |
| DEVICE A: AUTHENTICITY | OK |
| DEVICE A: USABLE PORT NUMBER | ― ― |
| DEVICE A: INSTALLATION DATE AND TIME | 201701010123 |

⋮

| | |
|---|---|
| DEVICE C: MAC ADDRESS | 00 80 19 AB 26 D0 |
| DEVICE C: IP ADDRESS | 192.168.090.215 |
| DEVICE C: CONNECTION DESTINATION | www.mainte.co.jp; www.service.co.jp; www.support.co.jp; |
| DEVICE C: AUTHENTICITY | NG |
| DEVICE C: USABLE PORT NUMBER | 80;442;37; |
| DEVICE C: INSTALLATION DATE AND TIME | 201606151600 |

⋮

CONTROL APPARATUS

CROSS-REFERENCE TO RELATED APPLICATIONS

This application is a division of U.S. patent application Ser. No. 16/109,602, filed on Aug. 22, 2018, which is based upon and claims the benefit of priority from Japanese Patent Application No. 2017-162722, filed Aug. 25, 2017, the entire contents of each of which are incorporated herein by reference.

FIELD

Embodiments described herein relate generally to a control apparatus.

BACKGROUND

In recent years, various devices such as a sensor, a camera, a light, or an air conditioner have been connected to networks to provide so-called IoT (Internet of Things) devices. Since, in general, these Internet-enabled IoT devices are often intended to be low cost and have low power consumption, there are cases in which effective security measures cannot always be provided for these IoT devices individually. In some cases, a control apparatus that controls the communication to/from the IoT device(s) using a communication permission list or a communication refusal list has been adopted.

However, there is a problem with the conventional control apparatus in that it needs to pre-store a communication permission/refusal list matching the IoT device(s) according to intended operations or the like.

BRIEF DESCRIPTION OF THE DRAWINGS

FIG. 3 is a diagram illustrating an example of device information according to the first embodiment.

FIG. 8 is a diagram illustrating an example of policy information according to the second embodiment.

FIG. 9 is a diagram illustrating an example of device information according to the second embodiment.

DETAILED DESCRIPTION

In accordance with an embodiment, a control apparatus includes a first communication interface for communicating with a first device over a local area network; a second communication interface for communicating with a second device over a wide area network; and a processor. The processor is configured to perform an authentication operation to authenticate the first device after connection of the first device to the first communication interface via the local area network, receive a first data transmission, addressed to the second device from the first device, through the first communication interface, control the second communication interface to permit the first data transmission to be transmitted to the second device over the wide area network when the first device has been authenticated by the authentication operation, and control the second communication interface to prevent the first data transmission from being transmitted to the second device over the wide area network when the first device has not been authenticated in the authentication operation.

Hereinafter, example embodiments will be described with reference to the accompanying drawings.

First Embodiment

A control system according to a first embodiment controls the communication of an IoT device. The control system monitors the content of the communication(s) performed by the IoT device. The control system authenticates whether a particular communication operation of the IoT device is appropriate. If a connection destination for the IoT device is inappropriate, the control system cuts off the communication of the IoT device. For example, this control system is installed in a retail store. However, the place where such a control system is installed is not limited to any specific place.

Figure 1:
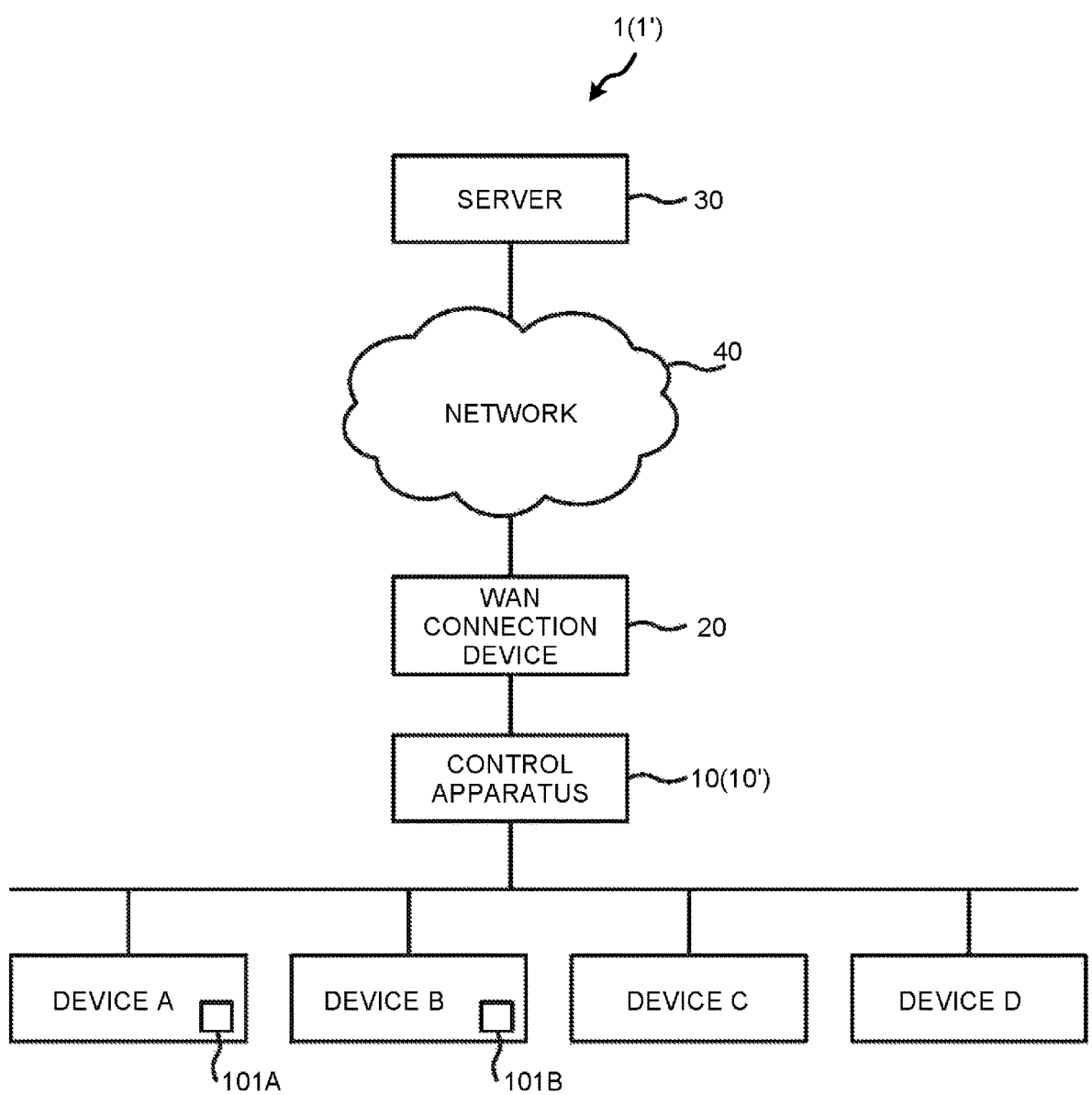
FIG. 1 is a block diagram illustrating an example of a configuration of a control system according to a first embodiment.

FIG. 1 is a block diagram illustrating an example of a configuration of a control system 1 according to the first embodiment.

As shown in FIG. 1, the control system 1 includes a control apparatus 10, a wide-area network (WAN) connection device 20, a server 30, a network 40, and devices A to D (device A, device B, device C, and device D) can be IoT devices, for example. The control apparatus 10 is connected to each of the devices A to D. The control apparatus 10 is connected to the WAN connection device 20. The WAN connection device 20 is connected to the server 30 via the network 40.

The control apparatus 10 controls communication of the devices A to D. The control apparatus 10 relays data of the devices A to D. The control apparatus 10 controls the communication between each of the devices A to D and the server 30. The control apparatus 10 relays data between the devices A to D and the server 30 via the WAN connection device 20.

The control apparatus 10 forms a network (a local area network (LAN)) for transmitting and receiving data to and from the devices A to D. The control apparatus 10 transmits and receives the data to and from the devices A to D.

The WAN connection device 20 supports the connection to the network 40. The WAN connection device 20 transfers the data from the control apparatus 10 to the network 40. The WAN connection device 20 transfers the data from the network 40 to the control apparatus 10.

The network 40 is a communication network for transmitting and receiving the data to and from the server 30. For example, network 40 is the Internet. The network 40 may be a single communication network.

The server 30 is not connected to the LAN formed by the control apparatus 10. In other words, the server 30 is connected to the devices A to D via the network 40 and the control apparatus 10. The server 30 may manage the devices A to D based on the data from the devices A to D. For example, the server 30 manages the operation state of the devices A to D. The operation and purpose of the server 30 are not limited to specific configurations.

The devices A to D are connected to the LAN formed by the control apparatus 10. The devices A to D are connected to each other via the LAN. The devices A to D are connected to the server 30 indirectly via the control apparatus 10. The devices A to D are IoT devices, for example. The devices A to D are, for example, a printer, a camera, a microphone, a sensor, a light, a drone, or a point-of-sale (POS) terminal. The devices A to D may also be a desktop PC, a notebook PC, a tablet PC, a smartphone, a wearable terminal, or the like. The configurations of the devices A to D are not limited to these examples.

The device A has a trusted platform module (TPM) 101A (Trusted Platform Module).

The TPM 101A is a module relating to the security of the device A. Here, the TPM 101A is used to detect falsification of the device A. For example, the device A authenticates itself with the TPM 101A at the time of starting.

The TPM 101A is used to issue a certificate for certifying the authenticity of the device A. For example, the TPM 101A generates an encryption key for a certificate. The device A transmits the certificate to the control apparatus 10 using the TPM 101A. For example, the device A transmits the certificate to the control apparatus 10 as a response to a request from the control apparatus 10.

The device B includes a trusted platform module (TPM) 101B. The TPM 101B has the same configuration and function as that of the TPM 101A.

The control system 1 may include another device as the IoT device connected to the LAN of the control apparatus 10 or exclude a predetermined device. The configuration of the control system 1 is not limited to a specific configuration.

Figure 2:
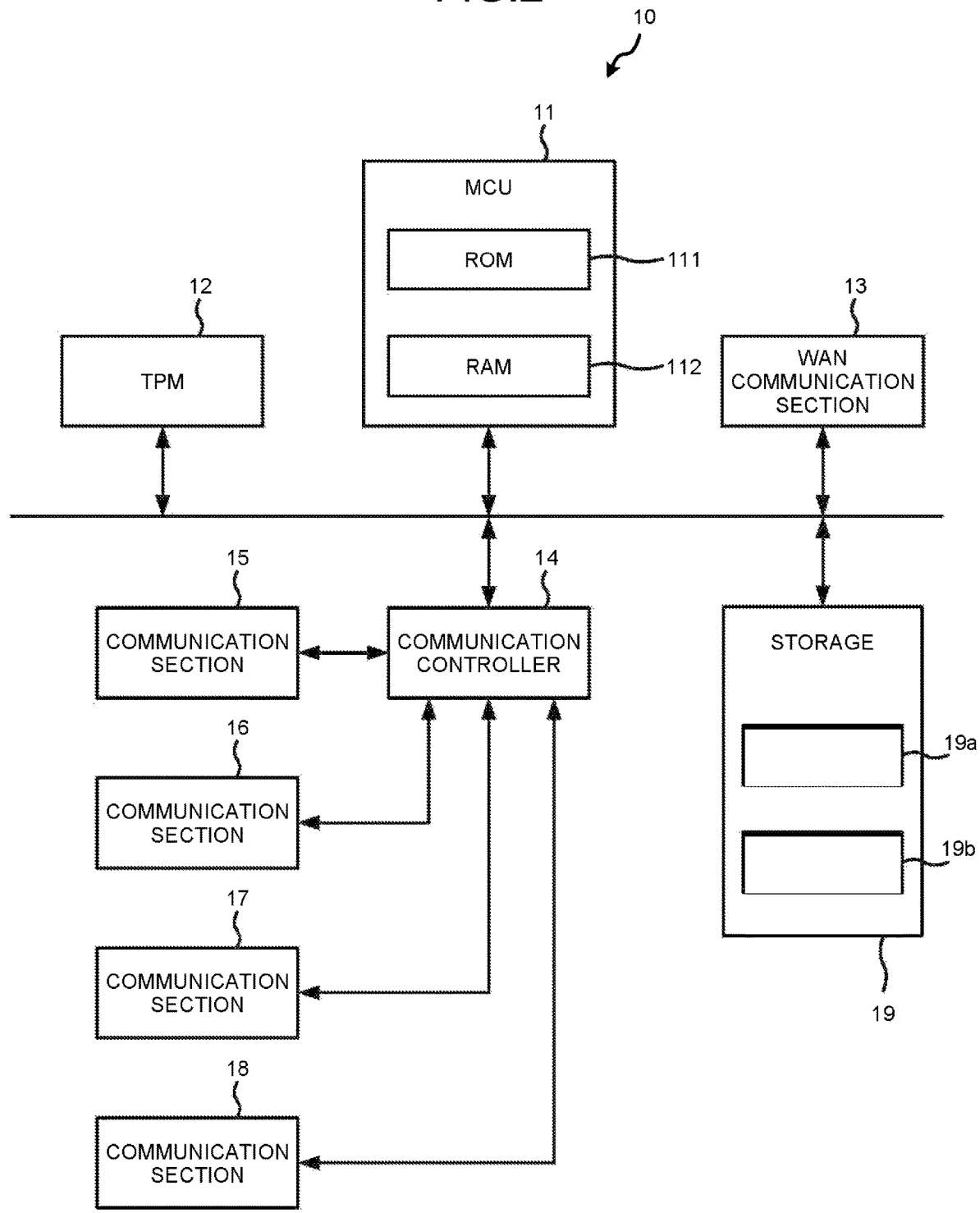
FIG. 2 is a block diagram illustrating an example of a configuration of a control apparatus according to the first embodiment.

FIG. 2 is a block diagram illustrating an example of a configuration of the control apparatus 10.

As shown in FIG. 2, the control apparatus 10 includes a microcontroller unit (MCU) 11, a trusted platform module (TPM) 12, a WAN communication section 13, a communication controller 14, communication sections 15, 16, 17, and 18, and a storage 19 as components. These units are connected to each other via a data bus. In addition to the depiction in FIG. 2, the control apparatus 10 may include additional components as required or certain components may be excluded or provided externally or the like.

The MCU 11 has a function of controlling the overall operation of the control apparatus 10. The MCU 11 may be a processor and include an internal memory and various interfaces. The MCU 11 implements various processes by executing programs stored in the internal memory, the ROM 111, or the storage 19 in advance.

Some of the various functions realized by executing the program by the MCU 11 may instead be realized by a dedicated hardware circuit or the like. In this case, the MCU 11 controls the functions executed by such a hardware circuit.

The MCU 11 includes a ROM 111, a RAM 112, and the like.

The ROM 111 is a nonvolatile memory in which a control program, control data, and the like are stored in advance. The control program and the control data stored in the ROM 111 are stored in advance according to the specifications of the control apparatus 10.

The RAM 112 is a volatile memory. The RAM 112 temporarily stores data being processed by the MCU 11. The RAM 112 stores various application programs based on commands from the MCU 11. The RAM 112 may store data necessary for executing an application program and/or an execution result provided by the application program.

The TPM 12 is a module relating to the security of the control apparatus 10. The TPM 12 is used to detect or prevent falsification of the control apparatus 10. For example, the control apparatus 10 authenticates itself with the TPM 12 at the time of starting.

The TPM 12 generates an encryption key for encrypting data to be stored in the storage 19 and a decryption key for decrypting the data stored in the storage 19.

The WAN communication section 13 is an interface for transmitting and receiving data to and from the WAN connection device 20. Specifically, the WAN communication section 13 is an interface for connecting to the network 40 (and, ultimately, the server 30) via the WAN connection device 20. The WAN communication section 13 transmits predetermined data to the WAN connection device 20 according to a signal from the MCU 11. The WAN communication section 13 transmits the data received from the WAN connection device 20 to the MCU 11.

The WAN communication section 13 may support the LAN connection.

The communication controller 14 is an interface for transmitting and receiving data to and from the communication sections 15 to 18. The communication controller 14 transmits the data from the communication sections 15 to 18 to the MCU 11. The communication controller 14 transmits the data from the MCU 11 to the communication sections 15 to 18.

The communication sections 15 to 18 are interfaces for transmitting and receiving data to and from a plurality of devices (in this case, the devices A to D). In this example, the communication sections 15 to 18 respectively transmit the data from the devices A to D to the communication control section 14. The communication sections 15 to 18 transmit the data from the communication control section 14 to the devices A to D, respectively.

The communication sections 15 to 18 support the LAN connection.

The storage 19 is a nonvolatile memory in which data can be written and rewritten. The storage 19 is, for example, a hard disk, a SSD, an EEPROM®Technology, or flash memory. The storage 19 stores programs, applications, and various data according to intended operation(s) of the control apparatus 10.

The storage 19 stores the encrypted data. The storage 19 stores data encrypted with the encryption key generated by the TPM 12.

The storage 19 includes a storage area 19a for storing an authentication program and a storage area 19b for storing device information. The authentication program and the device information are further described later.

The control apparatus 10 may further include a display or an input panel or the like.

The control apparatus 10 may be, for example, a router or the like. The control apparatus 10 may be a general-purpose PC. In the case of the general-purpose PC, a program for implementing the various functions of the control apparatus 10 may be installed.

Though depicted as separate units, the communication sections 15 to 18 may be integrally formed as single apparatus or interface component. For example, the communication sections 15 to 18 may communicate with the devices A to D wirelessly.

In this context, device information relates to the security of an IoT device (e.g., devices A to D) connected to the LAN of the control apparatus 10. The device information is set for each IoT device. If the IoT device is connected to any one of the communication sections 15 to 18, the MCU 11 generates device information corresponding to the IoT device and stores it in the storage area 19*b*.

The device information indicates the authenticity of the IoT device. In other words, the device information indicates whether a certificate for authenticating the IoT device has been received from the IoT device.

FIG. 3 shows an example of device information. FIG. 3 shows the device information corresponding to the device A and also the device information corresponding to the device C.

The device information includes a "MAC address", an "IP address", a "connection destination", an "authenticity", a "usable port number" and an "installation date and time" and the like.

The "MAC address" indicates a MAC (Media Access Control) address of the corresponding IoT device.

The "IP address" indicates an IP (Internet Protocol) address of the corresponding IoT device.

The "connection destination" indicates an address to which the corresponding IoT device is to be connected. Here, no "connection destination" has been set yet for either device A or device C.

The "authenticity" indicates the authenticity of the corresponding IoT device. In other words, the "authenticity", indicates whether the certificate has been received from the IoT device.

The "usable port number" indicates a port to which the corresponding IoT device can be connected. Here, No "usable port number" has been set yet.

The "installation date and time" indicates the date and time when the corresponding IoT device was connected to the control apparatus 10.

The device information may include components in addition to those shown in FIG. 3 or, in some instance, may exclude a component depicted in FIG. 3.

Next, the functions provided by the control apparatus 10 are described. The following functions are realized by execution of a program stored in the storage 19 by the MCU 11 in the control apparatus 10.

First, the MCU 11 has a function of the connected IoT device according to the authentication program or protocol.

For example, the MCU 11 permits an interrupt process at startup. If the IoT device is connected or disconnected, the MCU 11 begins the interrupt process. The MCU 11 authenticates the IoT device as the interrupt process. For example, if the MCU 11 determines that the IoT device is newly connected, the MCU 11 authenticates the device.

For example, if a new IoT device is connected to the control apparatus 10, the MCU 11 transmits a request for requesting a certificate to the IoT device. The MCU 11 receives the certificate from the IoT device. Upon receiving the certificate, the MCU 11 determines that the authentication of the IoT device succeeds. The MCU 11 may determine that the IoT device is successfully authenticated when the verification of the certificate is successful.

If it is determined that the authentication of the IoT device is successful, the MCU 11 stores information indicating that the IoT device is authenticated in the device information corresponding to the IoT device. For example, the MCU 11 stores "OK" in the "authenticity" field of the device information.

If the certificate is not received from the IoT device, the MCU 11 determines that the authentication of the IoT device fails. If it is determined that the authentication of the IoT device fails, the MCU 11 stores information indicating that the authentication of the IoT device has failed in the device information corresponding to the IoT device. For example, the MCU 11 stores "NG" in the "authenticity" field of the device information.

The MCU 11 has a function of managing data from each IoT device based on device information.

Whether the "authenticity" of the device information is "OK", or "NG", the MCU 11 may connect the IoT device to an internal device (for example, devices A to D) of an internal network (for example, LAN) formed by the MCU 11. Specifically, if the destination of the data of the IoT device is one of devices A to D connected through the communication sections 15 to 18, the MCU 11 transmits the data to the destination.

The MCU 11 connects an IoT device whose "authenticity" field in the device information is set as "OK" to the network 40. In other words, the MCU 11 connects this IoT device to a device (for example, the server 30) connected through the WAN communication section 13. For example, if the destination of the data of the IoT device is the server 30, the MCU 11 transmits the data to the server 30 via the WAN connection device 20 and the network 40.

The MCU 11 does not connect an IoT device whose "authenticity", field in the device information is set as "NG" to the network 40. If the destination of the data of the IoT device is the server 30, the MCU 11 cuts off communication from the IoT device to the network 40.

If the communication from the IoT device to the network 40 is cut off, the MCU 11 may cut off any further communication from the IoT device until an operation or instruction from an operation manager or administrator is received. The MCU 11 may still connect the IoT device to another device connected to the internal network.

In the example shown in FIG. 3, the "authenticity" for the device A is set as "OK". The "authenticity" for the device C is set as "NG". Therefore, the MCU 11 connects the device A to the network 40. The MCU 11 does not connect the device C to the network 40.

Figure 4:
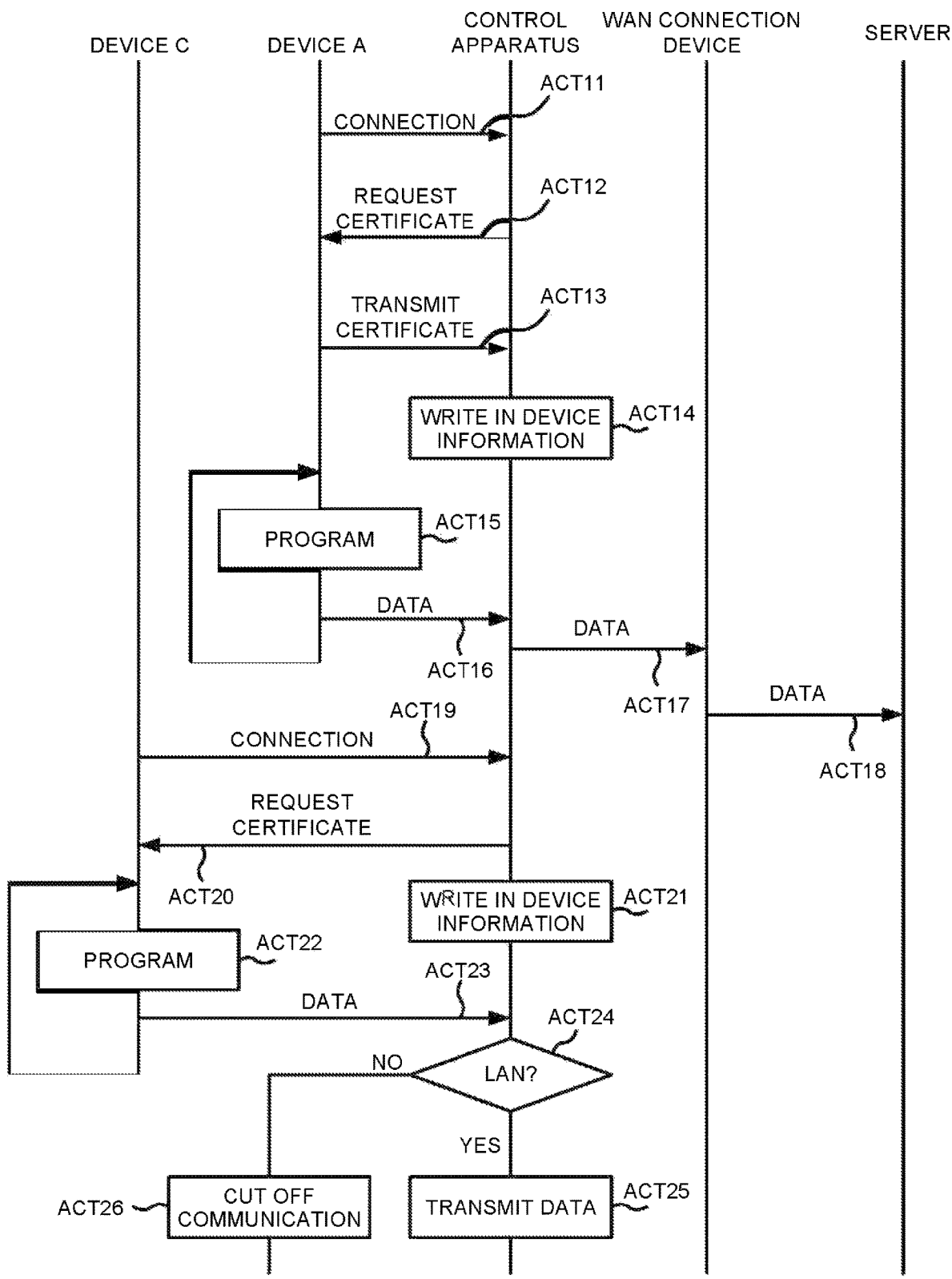
FIG. 4 is a sequence diagram illustrating an operation example of a control apparatus according to the first embodiment.

FIG. 4 is a sequence diagram for explaining an operation example of the control system 1.

Here, it is assumed that the device A is connected to the communication section 15 of the control apparatus 10. Then, it is assumed that the device C is connected to the communication section 17 of the control apparatus 10.

First, the device A is connected to the communication section 15 through an operation by an administrator or the like (ACT 11). If the device A is connected to the communication section 15, the MCU 11 of the control apparatus 10 transmits a request for the authenticating certificate to the device A through the communication section 15 (ACT 12).

The device A receives the request. Upon receiving the request, the device A generates the certificate using the TPM 101A and transmits the certificate to the control apparatus 10 (ACT 13).

The MCU 11 receives the certificate through the communication section 15. Upon receiving the certificate, the MCU 11 stores "OK", in the "authenticity" field of the device information corresponding to the device A (ACT 14).

The device A operates according to a program (ACT 15). The device A transmits the data to be transmitted to the server 30 to the control apparatus 10 at a predetermined timing (ACT 16). The MCU 11 receives the data through the communication section 15.

Upon receiving the data, the MCU 11 transmits the data to the WAN connection device 20 through the WAN communication section 13 (ACT 17). The WAN connection device 20 receives the data. The WAN connection device 20 transmits the data to the server 30 via the network 40 (ACT 18).

Through an operation of an administrator or the like, the device C is connected to the communication section 17 (ACT 19). When the device C is connected to the communication section 17, the MCU 11 of the control apparatus 10 transmits a request for the certificate to the device C through the communication section 17 (ACT 20).

If the certificate is not received even after the elapse of a predetermined period, the MCU 11 stores "NG" in the "authenticity", field of the device information corresponding to the device C (ACT 21).

The device C operates according to a program (ACT 22). The device C transmits the data to the control apparatus 10 at a predetermined timing (ACT 23). The MCU 11 receives the data through the communication section 17.

The MCU 11 determines whether the destination of the data is another device (e.g., device A, B or D) connected to the internal network (ACT 24). If it is determined that the destination of the data is another device connected to the internal network (Yes in ACT 24), the MCU 11 transmits the data to the destination (ACT 25).

If it is determined that the destination of the data is not a device connected to the internal network (No in ACT 24), the MCU 11 cuts off communication with the device C (ACT 26).

Figure 5:
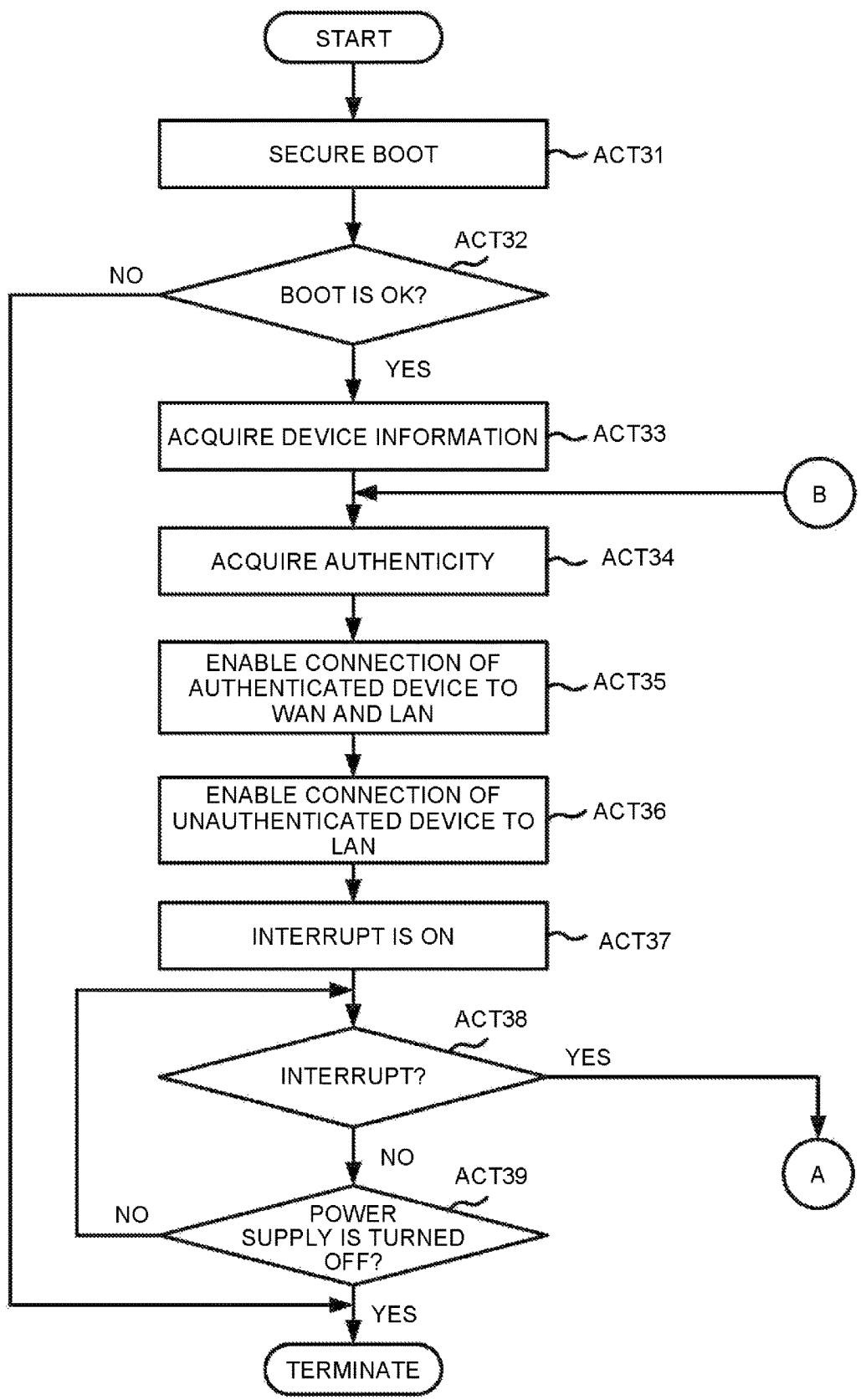
FIG. 5 is a flowchart for depicting an operation example of a control apparatus according to the first embodiment.
Figure 6:
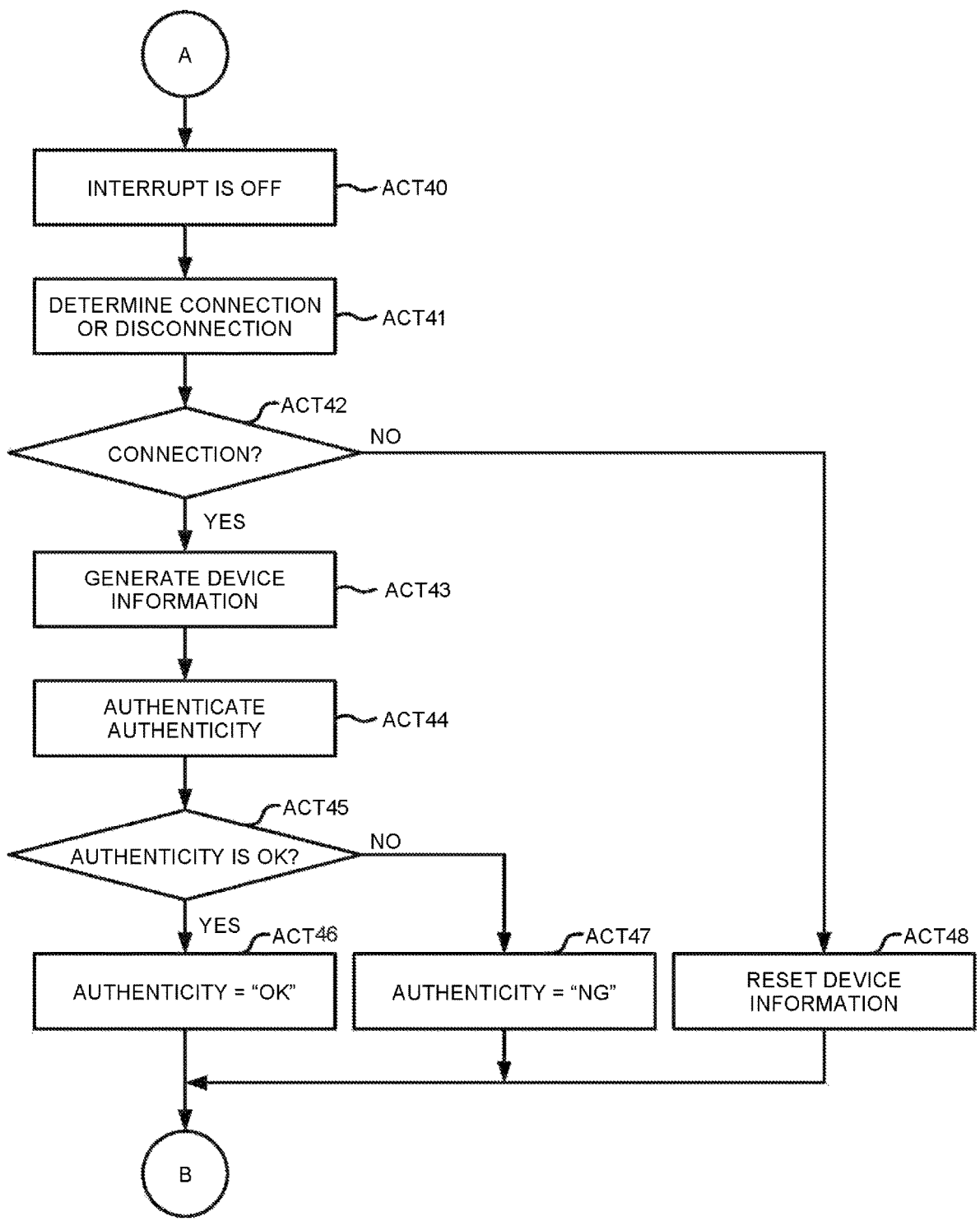
FIG. 6 is a flowchart for depicting an operation example of a control apparatus according to the first embodiment.

FIG. 5 and FIG. 6 are flowcharts for explaining aspects of the operation of the control apparatus 10

First, the MCU 11 of the control apparatus 10 is started safely using the TPM 12 (ACT 31). If the MCU 11 is successfully started (Yes in ACT 32), the MCU 11 acquires device information from the storage area 19b (ACT 33).

Upon acquiring the device information, the MCU 11 acquires the "authenticity" of the device information (ACT 34). After checking the "authenticity" in the device information, the MCU 11 enables the connection of each device whose "authenticity" is "OK" to the network 40 and the internal network (ACT 35).

If the connection to the network 40 and the internal network is enabled, the MCU 11 enables a connection between each device whose "authenticity" is "NG" and the internal network (ACT 36).

Once the connection with the internal network is enabled, the MCU 11 makes a setting to permit an interrupt process (ACT 37). After a setting for permitting the interrupt process is performed, the MCU 11 determines whether there is an interrupt event (connection or disconnection of the IoT device) (ACT 38).

If it is determined that there has been no interrupt (No in ACT 38), the MCU 11 determines whether an operation for turning off the power supply has been received through the input section or the like (ACT 39). If it is determined that the operation for turning off the power supply has not been received (No in ACT 39), the MCU 11 returns to the process in ACT 38.

If it is determined that there has been an interrupt event (Yes in ACT 38), the MCU 11 performs setting to reject the interrupt process (ACT 40). When the setting for rejecting the interrupt process is performed, the MCU 11 determines whether the IoT device is connected or disconnected (ACT 41).

If it is determined that the IoT device is connected (Yes in ACT 42), the MCU 11 generates the device information corresponding to the IoT device and stores this device information in the storage area 19b (ACT 43). After the device information is stored, the MCU 11 attempts to authenticate the IoT device (ACT 44). If the authentication of the IoT device is successful (Yes in ACT 45), the MCU 11 stores "OK" in the "authenticity" field corresponding to the IoT device (ACT 46).

If the authentication of the IoT device fails (No in ACT 45), the MCU 11 stores "NG" in the "authenticity" field corresponding to the IoT device (ACT 47).

If it is determined that the IoT device is disconnected (No in ACT 42), the MCU 11 resets the device information of the IoT device (ACT 48). For example, the MCU 11 may delete the device information from the storage area 19b.

According to the authentication result, "OK" is stored in the "authenticity" field (ACT 46), or "NG" is stored in the "authenticity" field (ACT 47), and then the MCU 11 returns to the process in ACT 34. Also, if the device information is reset (ACT 48), the MCU returns to process at ACT 34.

If the startup (boot process) of the MCU 11 fails (No in ACT 32) or if it is determined that the operation for turning off the power supply is received (Yes in ACT 39), the MCU 11 terminates the operation.

The MCU 11 may generate the device information based on the authentication result after the authenticity of the IoT device has been determined.

The MCU 11 may periodically re-authenticate the IoT device to update the "authenticity" field of the device information.

The storage 19 may store unencrypted data.

The control apparatus 10 configured as described above can connect the IoT devices that have been authenticated to an external network. The control apparatus 10 does not connect the IoT devices that fail authentication to the external network. As a result, the control apparatus 10 can prevent IoT devices from transmitting inappropriate data.

The control apparatus 10 can provide security relating to the IoT devices without separately establishing a security server or the like.

The control apparatus 10 may still connects the IoT devices that fails authentication to the internal network (e.g., LAN). As a result, the control apparatus 10 does not prevent those IoT devices that do not have the capability of transmitting an authenticating certificate from transmitting data to other devices on the internal (local) network. Therefore, the control apparatus can provide security in communications to/from the external network while still permitting communication on the internal network.

Second Embodiment

A control apparatus according to the second embodiment is different from that according to the first embodiment in that it monitors the communication of IoT devices and selects or sets the devices to which each IoT device is permitted to connect. In general, components of the second embodiment which are substantially similar to those of the first embodiment are denoted with the same reference numerals, and the detailed description of repeated components may be omitted.

FIG. 1 is a block diagram illustrating an example of a configuration of a control system 1' according to the second embodiment. As shown in FIG. 1, the control system 1' includes a control apparatus 10' instead of the control apparatus 10.

Figure 7:
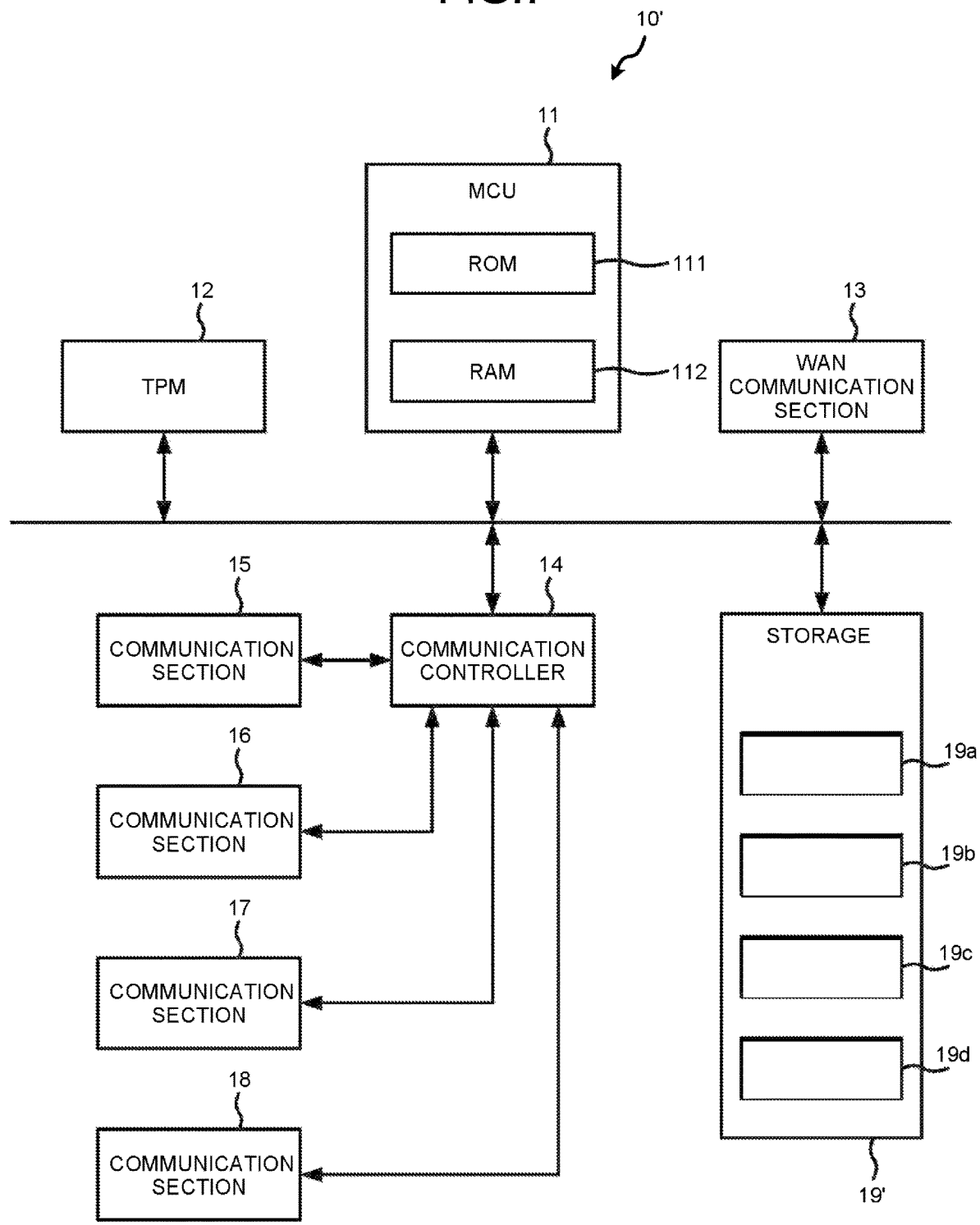
FIG. 7 is a block diagram illustrating an example of a configuration of a control apparatus according to a second embodiment.

FIG. 7 is a block diagram illustrating an example of a configuration of the control apparatus 10'. As shown in FIG. 7, the control apparatus 10' includes a storage 19' instead of the storage 19.

The storage 19' includes a storage area 19c for storing a connected device check program and a storage area 19d for storing policy information. Storage 19' also includes storage area 19a and 19b, which are similar to those described in connection with the first embodiment.

The stored policy information relates to security aspects when an IoT device is connected to the external network 40. The policy information sets a device (such as a particular server) or a port to which the IoT device is permitted to connect.

For example, the policy information establishes a networked device or a port to which an unauthenticated IoT device (or an IoT that is not capable of transmitting a certificate) is permitted to connect.

FIG. 8 shows an example of a configuration of policy information.

As shown in FIG. 8, the policy information includes fields for "authenticity", "connection destination restriction", "permitted connection destination list", "prohibited connection destination list", "port restriction", "permitted port list", "installation date and time restriction", "restriction date and time (start)", and "restriction date and time (end)", and the like.

The "authenticity" field indicates whether the authentication of the IoT device is required to permit the connection of the IoT device to the network 40. Here, the "authenticity" field does not indicate whether or not the IoT has actually been successfully authenticated or not, it is rather just a parameter for policy information settings.

The "connection destination restriction" value indicates whether to restrict the connection destinations of an unauthenticated IoT device. Here, the "connection destination restriction" value "YES" (or zero) indicates that the connection destination is restricted.

The "permitted connection destination list" indicates at least one connection destination to which the connection of an unauthenticated IoT device is permitted. Here, the "permitted connection destination list" stores a URL address or the like of a server to which the connection is to be permitted.

The "prohibited connection destination list" stores at least one connection destination to which the unauthenticated IoT device is prohibited from connecting. The "prohibited connection destination list" stores a URL address or the like of a server to which connection is prohibited.

The "port restriction" value indicates whether to restrict the port to which an unauthenticated IoT device can be connected. Here, the "port restriction" value "Yes" (or zero) indicates that the port is restricted.

The "permitted port list" indicates at least one port to which the connection of the unauthenticated IoT device is permitted. Here, the "permitted port list" stores port numbers or the like to which the connection is permitted.

The "installation date and time restriction" value indicates whether or not to restrict the installation period for the IoT device. If the "installation date and time restriction" value indicates that the installation period is restricted ("Yes" or zero), then control apparatus 10 only transmits the data from the IoT device to the internal network or the network 40 within a particular installation period. That is, the control apparatus 10 does not permit the IoT device to connect to the internal network or the network 40 except during the installation period.

The "restriction date and time (start)" indicates the start for the installation period. For example, the "restriction date and time (start)" is a calendar date and a clock time.

The "restriction date and time (end)" indicates the end of the installation period. For example, the "restriction date and time (end)" is composed of a calendar date and a clock time.

The policy information may include aspects in addition to the aspects shown in FIG. 8; likewise, specific aspects included in FIG. 8 may be excluded from the policy information in some embodiments.

The following functions of the control apparatus 10' are realized by the MCU 11 executing a program stored in the storage 19'. The control apparatus 10' provides the following functions in addition to those functions of the control apparatus 10 described in conjunction with the first embodiment.

The MCU 11 in the control apparatus 10' sets the "connection destination" and the "usable port number" in the device information for the unauthenticated IoT device(s) according to a connected device check program.

Firstly, the MCU 11 has a function of monitoring the communication of an unauthenticated IoT device for a predetermined period.

The MCU 11 monitors the communication of the IoT device for a predetermined setup period of time after determining that the IoT device has been connected and is unauthenticated. For example, the MCU 11 monitors the communication of an IoT device during a period in which the IoT device is being set up or initialized.

The MCU 11 specifies a destination and a port to which the IoT device can transmit data via the network 40. In other words, the MCU 11 specifies a device and a port to which the IoT device can be connected via the network 40.

During the predetermined setup period, the MCU 11 transmits data from the IoT device to the destination device/port via the network 40. The MCU 11 updates the device information based on the destination device and/or port to which the IoT device is connected during this predetermined setup period.

The MCU 11 stores the specified device and port in the device information as the device and the port to which the connection of the IoT device is permitted. For example, the MCU 11 stores the URL of the device as the "connection destination" of the device information for the IoT device. Similarly, the MCU 11 stores the port number as the "usable port number" of the device information for the IoT device.

If the specified device is also in the "prohibited connection destination list" of the policy information, the MCU 11 may be configured not to store such a destination device in the "connection destination" field.

The MCU 11 has a function of updating the device information based on the policy information.

The MCU 11 adds a device in the "permitted connection destination list" of the policy information to the "connection destination" field of the device information. The MCU 11 adds a port of the "permitted port list" in the policy information to the "usable port number" field of the device information.

FIG. 9 shows an example of the device information according to the second embodiment. Here, device information corresponding to the device C is described.

The "connection destination" field of the device information stores "www.mainte.co.jp; www.service.co.jp; www.support.co.jp;". Here, it is assumed that the MCU 11 specifies "www.mainte.co.jp", as a destination device in the predetermined setup period. It is assumed that the MCU 11 acquires "www.service.co.jp; www.support.co.jp;" from the "permitted connection destination list" in the policy information and adds these to the "connection destination" field of the device information.

The "usable port number" field of the device information stores "80; 442; 37;". Here, it is assumed that the MCU 11 specifies "37", as a port used during the predetermined setup period. It is assumed that the MCU 11 acquires "80; 442" from the "permitted connection destination list" of the policy information and adds this to the "usable port number" field of the device information.

The MCU 11 has a function of detecting the destination and port for data transmitted by the unauthenticated IoT device to the network 40.

For example, the MCU 11 detects the destination and the destination port based on a header of the data transmission. The MCU 11 determines the destination and the port by extracting this information from the header.

The MCU 11 has a function of setting a connection destination and a port to which connection of the IoT device is permitted.

The MCU 11 checks to the device information for the IoT device to set the permitted connection destination(s) and the permitted port(s). In other words, the MCU 11 acquires the values in the "connection destination" and the "usable port number" fields from the device information.

The MCU 11 has a function of determining whether the intended destination and the destination port for a data transmission are a permitted connection destination and a permitted port according to the stored device information.

For example, the MCU 11 determines whether there is a permitted connection destination matching the intended destination of the data and a permitted port matching the intended destination port.

The MCU 11 has a function of transmitting the data to the destination port of the destination if it is determined that bot the destination and the destination port for the data are permitted.

The MCU 11 transmits the data from the IoT device according to the destination and the destination port of the data.

If it is determined that the intended destination and port are not permitted for the IoT device, the MCU 11 can cut off communication from the IoT device. That is, the MCU 11 does not transmit the data from the IoT device to any destination. After cutting off the communication from the IoT device, if another data transmission from the IoT has a permitted connection destination and port is received, the MCU 11 may transmit this data as intended. Alternatively, once the communication from the IoT device has been cut off, the MCU 11 may continue forbid transmission of data from the IoT device until receiving an instruction from an administrator or the like.

When the communication from the IoT device is cut off, the MCU 11 may supply a notice that communication from the IoT device has been cut off. For example, the MCU 11 may display a predetermined warning message on its display. The MCU 11 may also or instead issue a warning sound through a speaker or the like. The MCU 11 may also or instead transmit a predetermined signal to an external device.

Figure 10:
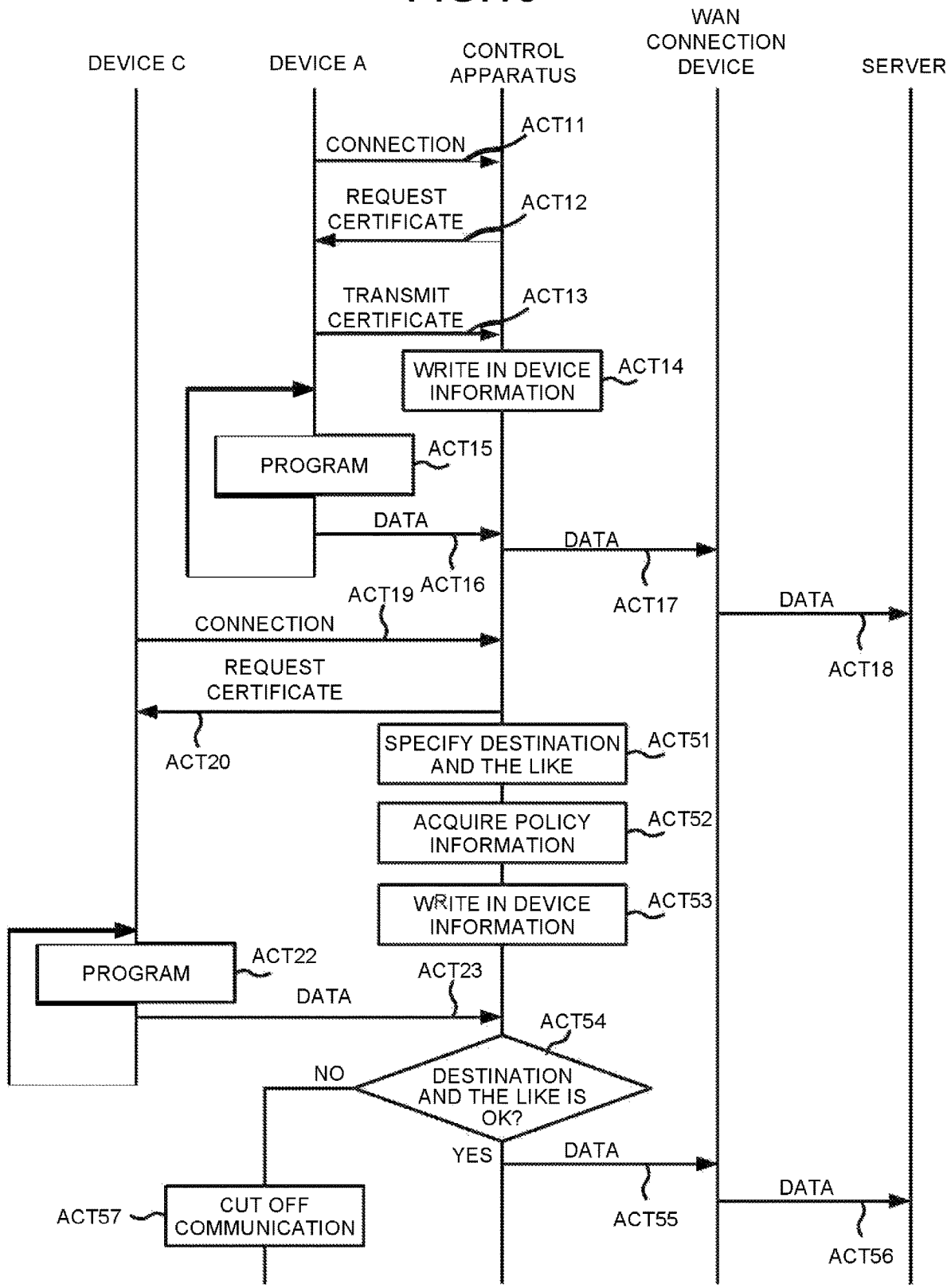
FIG. 10 is a sequence diagram illustrating an operation example of a control apparatus according to the second embodiment.

Next, an operation example of the control system 1' is described. FIG. 10 is a sequence diagram for explaining an operation example of the control system 1'.

Here, it is assumed that device A is connected to the communication section 15 of the control apparatus 10'. It is further assumed that device C is connected to the communication section 17 of the control apparatus 10'.

The processes in ACTs 11 to 18, 22, and 23 are similar to those in the first embodiment, and thus, additional description thereof has been omitted.

The MCU 11 monitors the communication from the device C for a predetermined setup period after the certificate request has been transmitted to device C. The MCU 11 specifies (detects) the destination and the destination port of the data transmissions from the device C (ACT 51) until a valid certificate has been received.

If a transmission to a destination and destination port is detected during this time, the MCU 11 acquires the "permitted connection destination list" and the "permitted port list" in the policy information (ACT 52).

Once the "permitted connection destination list" and the "permitted port list" of the policy information are acquired, the MCU 11 stores the specified destination and destination port together with the "permitted connection destination list" and the "permitted port list" in the device information for the device C (ACT 53).

When a data transmission from the device C to the network 40 is received, the MCU 11 checks whether the intended destination and port of the data transmission are contained in the "connection destination" and the "usable port number" of the device information (ACT 54). If it is determined that the destination and port are included in the "connection destination" and the "usable port number" (Yes in ACT 54), the MCU 11 transmits the data to the WAN connection device 20 through the WAN communication section 13 (ACT 55).

The WAN connection device 20 receives the data. The WAN connection device 20 transmits the data to the destination (for example, the server 30) via the network 40 (ACT 56).

If it is determined that the destination and port are not included in the "connection destination" and the "usable port number" (No in ACT 54), the MCU 11 cuts off the communication of the device C (ACT 57).

Figure 11:
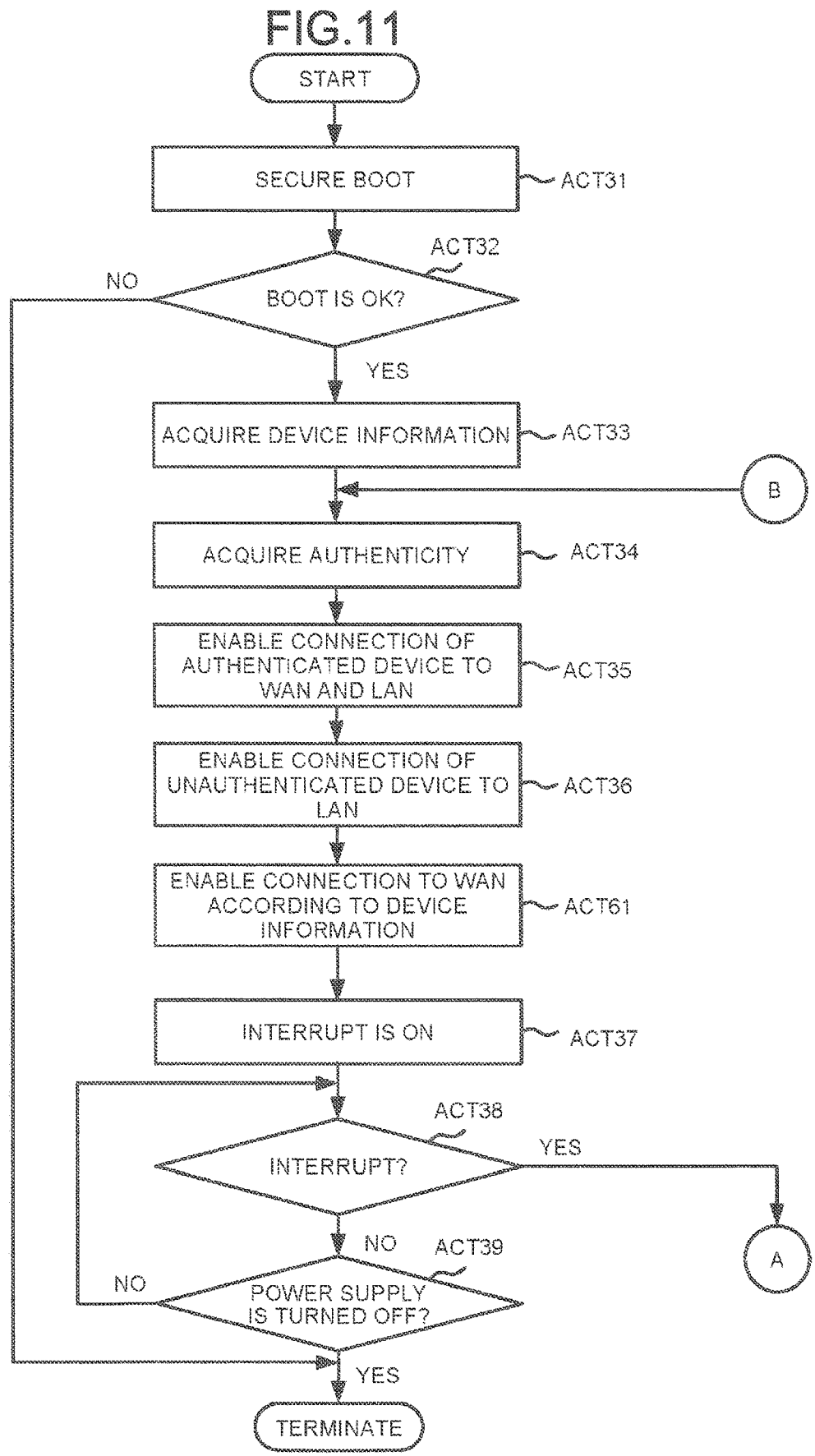
FIG. 11 is a flowchart depicting an operation example of a control apparatus according to the second embodiment.
Figure 12:
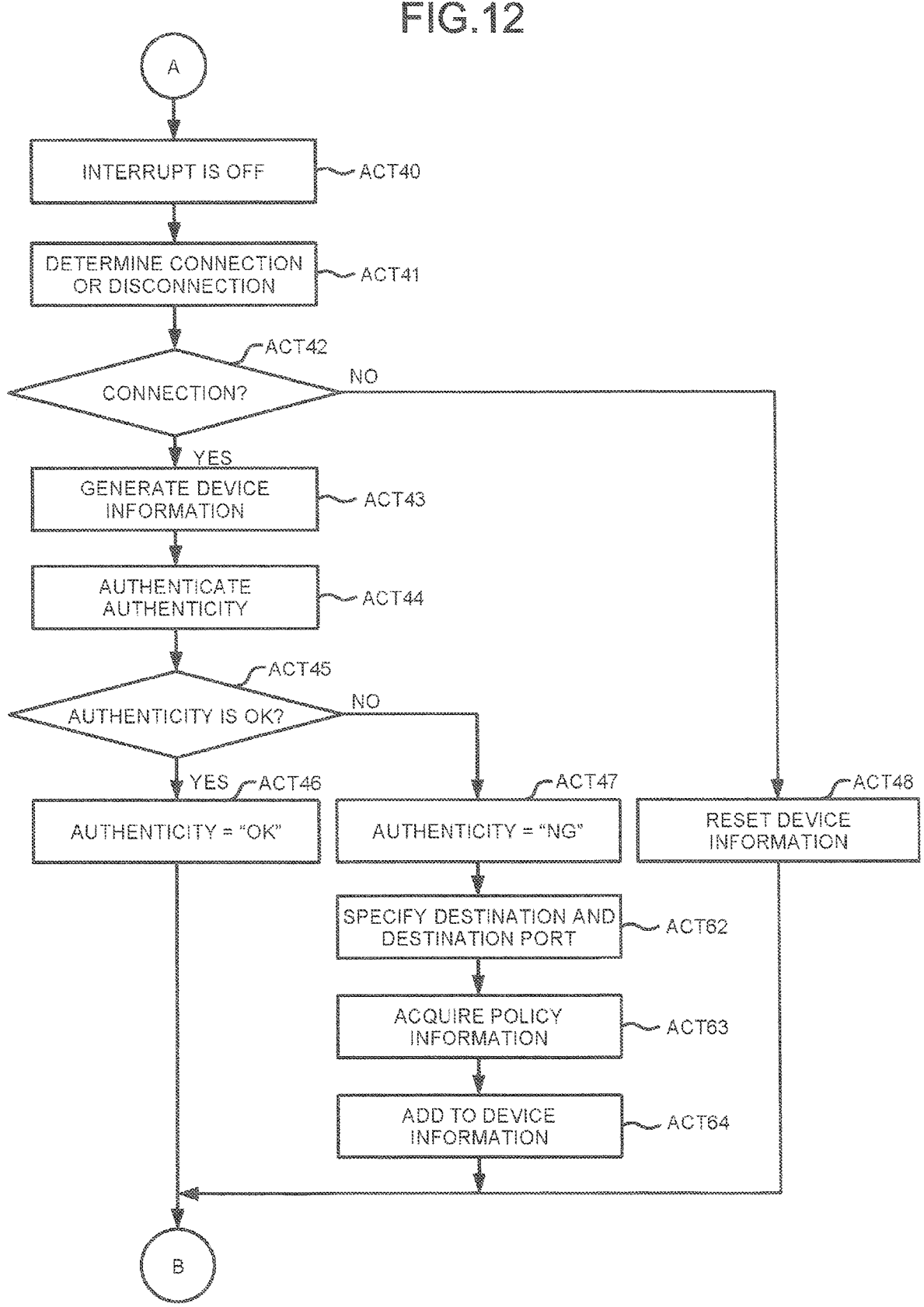
FIG. 12 is a flowchart depicting an operation example of a control apparatus according to the second embodiment.

Next, an operation example of the control apparatus 10' is described. FIGS. 11 and 12 are flowcharts for explaining the operation of the control apparatus 10'.

The processes in ACTs 31 to 48 are the same as those of the first embodiment, and thus, the description thereof is omitted.

When the connection between an unauthenticated IoT device and the internal network is enabled (ACT 36), the MCU 11 also enables connections to destinations across the WAN (network 40) according to the "connection destination" and the "usable port number" fields of the device information for the (unauthenticated) IoT device C (ACT 61).

When communication over the WAN is permitted, the MCU 11 makes a setting to permit the interrupt process (ACT 37).

If "NG" is stored in the "authenticity" field of the device information (ACT 47), the MCU 11 will monitor communications of the device for a predetermined period and during this time will specify (detect) the destination and the destination port of data transmitted by the IoT device C (ACT 62). After specifying the destination and the destination port, the MCU 11 acquires the "permitted connection destination list" and the "permitted port list" of the policy information (ACT 63).

Once the "permitted connection destination list" and the "permitted port list" of the policy information are acquired, the MCU 11 stores the destination and destination port specified during the predetermined time together with the "permitted connection destination list" and the "permitted port list" in the device information corresponding to the device C (ACT 64). The MCU 11 then returns to the process in ACT 34.

The storage 19' does not necessarily need to store relevant policy information. The MCU 11 may instead just monitor the communications of the IoT device to set the "connection destination" and "usable port number" in the device information.

The control apparatus 10' configured as described above monitors the communication of an unauthenticated IoT device and sets permissible connection destinations for the IoT device. Therefore, if the IoT device is hijacked or otherwise attempts to connect to an improper device, the control apparatus can cut off communication of such an IoT device.

The control apparatus 10' can however still appropriately set permissible connection destinations for the IoT device to include certain destinations not specifically included in the pre-stored policy information.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A control apparatus, comprising:
    a microcontroller unit connected to an internal bus;
    a communication controller connected to the microcontroller unit by the internal bus;
    a local communication interface connected to the communication controller and configured to communicate via a local network to a first device;
    a wide area network communication interface connected to the internal bus and configured to communicate via a wide area network connection to a second device; and
    a storage unit connected to the internal bus and storing an authentication program, which when executed by the microcontroller unit operates perform an authenticate operation on the first device, and a first device information which indicates whether the first device has been successfully authenticated in the authentication operation, wherein
    the microcontroller unit is configured to:
        detect a connection of the first device to the local communication interface,
        execute the authentication program,
        update the first device information stored in the storage unit according to a result of the authentication operation on the first device,
        permit the first device to communicate with a third device on the local network even if stored first device information indicates the first device has not been successfully authenticated, and
        prevent the first device from communicating with the second device unless stored first device information indicates the first device has been successfully authenticated.

2. The control apparatus according to claim 1, further comprising:
    a trusted platform module configured to generate an encryption key for encrypting the first device information stored in the storage unit.

3. The control apparatus according to claim 1, wherein the authentication operation includes transmission of a certificate request to the first device.

4. The control apparatus according to claim 1, wherein the local network is a wireless network.

5. The control apparatus according to claim 1, wherein the wide area network is the Internet.

6. The control apparatus according to claim 1, wherein the storage unit further stores policy information including a permitted connection list.

7. The control apparatus according to claim 6, wherein the first device information is updated to include connection addresses in the permitted connection list if the first device has not been successfully authenticated after an elapse of a predetermined period of time.

8. The control apparatus according to claim 6, wherein the microcontroller is configured to monitor each data transmission by the first device during a predetermined period of time after connection of the first device and extract a destination address of each data transmission through the wide area connection and update the first device information to include each extracted destination address as a permissible destination for communication from the first device.

9. The control apparatus according to claim 1, wherein the microcontroller is configured to monitor each data transmission by the first device during a predetermined period of time after connection of the first device and extract a destination address of each data transmission through the wide area connection and update the first device information to include each extracted destination address as a permissible destination for communication from the first device.

10. A method of controlling data transmissions of Internet-enabled devices, comprising:
    determining a first device has been connected to a control apparatus via a local network;
    requesting an authenticating certificate from the first device after determining the first device has been connected to the control apparatus via the local network;
    receiving a first data transmission from the first device during a predetermined period of time after requesting the authenticating certificate, the first data transmission being addressed to a second device that is connected to the control apparatus via a wide area network;
    extracting a destination address of the second device from the first data transmission;
    writing the extracted destination address to a storage unit including device information associated with the first device;
    after the predetermined period of time has elapsed, receiving a second data transmission from the first device and determining whether the second data transmission is addressed to the second device by reference to the written destination address in the storage unit; and
    permitting the second data transmission to be transmitted to the second device even when the first device has not been successfully authenticated.

11. The method of claim 10, further comprising:
stopping policy information in the storage unit, the policy information including a permitted destination list for the first device; and
updating the device information written to the storage unit to include addresses from the permitted destination list along with the extracted destination address of the second device as a permissible communication address for the first device.

* * * * *